(12) United States Patent
Thierauf

(10) Patent No.: US 12,136,310 B2
(45) Date of Patent: Nov. 5, 2024

(54) OPTICAL SENSOR FOR EXAMINING VALUABLE DOCUMENTS

(71) Applicant: GIESECKE+DEVRIENT CURRENCY TECHNOLOGY GMBH, Munich (DE)

(72) Inventor: Klaus Thierauf, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 208 days.

(21) Appl. No.: 17/904,165

(22) PCT Filed: Feb. 11, 2021

(86) PCT No.: PCT/EP2021/025050
§ 371 (c)(1),
(2) Date: Aug. 12, 2022

(87) PCT Pub. No.: WO2021/160344
PCT Pub. Date: Aug. 19, 2021

(65) Prior Publication Data
US 2023/0069662 A1    Mar. 2, 2023

(30) Foreign Application Priority Data
Feb. 14, 2020  (DE) .................. 10 2020 000968.9

(51) Int. Cl.
*G07D 7/121*    (2016.01)
*G01N 21/55*    (2014.01)

(52) U.S. Cl.
CPC .............. *G07D 7/121* (2013.01); *G01N 21/55* (2013.01); *G01N 2021/558* (2013.01);
(Continued)

(58) Field of Classification Search
CPC .. G07D 7/121; G01N 21/55; G01N 2021/558; G01N 2201/121; G01N 2201/1211; G01N 2201/12707
See application file for complete search history.

(56) References Cited

U.S. PATENT DOCUMENTS 4,159,874 A  *  7/1979  Dearth .................. G06T 1/0007
                                              356/73
5,910,663 A     6/1999  Naka
                        (Continued)

FOREIGN PATENT DOCUMENTS

CN        1185603 C  *  1/2005  ............. G07D 7/121
DE       19958048 A1     6/2001
                        (Continued)

OTHER PUBLICATIONS

Search Report from corresponding German Application No. 102020000968.9, Oct. 29, 2020.
(Continued)

*Primary Examiner* — Mohamed K Amara
(74) *Attorney, Agent, or Firm* — Workman Nydegger

(57) ABSTRACT

An optical sensor for examining value documents, such that at a point in time before the check of the value documents, a self-test of the optical sensor is carried out, during which the light sources thereof are switched on, and, with the aid of monitor elements, the respective light intensity of the light source assigned to the respective monitor element is detected which impinges on the respective monitor element at the time of the self-test. During the check of a value document following the self-test, the light sources illuminate the value document, and measured values are recorded. The recorded measured values are then corrected with the aid of the light intensities detected by the monitor elements at the time of the self-test to take into account a change in the light (Continued)

intensity emitted by the light sources that occurs in the course of the service life of the light sources.

17 Claims, 3 Drawing Sheets

(52) U.S. Cl.
CPC ............... *G01N 2201/121* (2013.01); *G01N 2201/1211* (2013.01); *G01N 2201/12707* (2013.01)

(56) References Cited

U.S. PATENT DOCUMENTS

| | | | |
|---|---|---|---|
| 6,881,962 B2 | 4/2005 | Kamijo et al. | |
| 6,918,482 B2 | 7/2005 | Thierauf | |
| 7,378,665 B2 | 5/2008 | Schuett et al. | |
| 7,550,736 B2 | 6/2009 | Schuett et al. | |
| 8,107,712 B2 | 1/2012 | Holl | |
| 9,852,568 B2 * | 12/2017 | Su | G07D 7/181 |
| 10,417,856 B2 * | 9/2019 | Clara | G07D 7/1205 |
| 10,740,998 B2 * | 8/2020 | Bogaki | G07D 7/121 |
| 2002/0195571 A1 | 12/2002 | Kamijo et al. | |
| 2003/0039359 A1 | 2/2003 | Thierauf | |
| 2005/0156116 A1 | 7/2005 | Schuett et al. | |
| 2006/0140468 A1 | 6/2006 | Holl | |
| 2008/0185530 A1 | 8/2008 | Schuett et al. | |
| 2022/0277607 A1 * | 9/2022 | Deckenbach | B42D 25/29 |
| 2023/0316842 A1 * | 10/2023 | Rauscher | G01N 21/643 |
| | | | 250/459.1 |

FOREIGN PATENT DOCUMENTS

| | | | | |
|---|---|---|---|---|
| DE | 10160578 A1 | 2/2004 | | |
| DE | 10243051 A1 | 3/2004 | | |
| EP | 2282298 A2 * | 2/2011 | ............... G07D 7/12 |

OTHER PUBLICATIONS

International Search Report from PCT Application No. PCT/EP2021/025050, May 21, 2021.

* cited by examiner

OPTICAL SENSOR FOR EXAMINING VALUABLE DOCUMENTS

BACKGROUND

The invention relates to an optical sensor for checking value documents.

It is known from the prior art to illuminate value documents and to check the optical reflectance of the respective value document. Alternatively, the value documents can also be optically excited with the illuminating light and their measured luminescence values can be checked. The term luminescence is understood as a generic term for the radiation emitted back by the value document after optical excitation, e.g. fluorescence or phosphorescence. The light emanating from the value document as a result of the illumination is detected by a photodetector and the measured values detected are subsequently evaluated. To distinguish authentic value documents from forgeries, it is checked, for example, whether the measured reflectance values or the measured luminescence values of a specific section of a value document examined are above or below specific threshold values.

It is also known that the light intensity emitted by a light source typically decreases over the course of the service life of the light source. Therefore, the emitted light intensity is monitored with the aid of a monitor diode arranged near the light source. In order to compensate for the decreasing intensity of the light source, the light source current is then often readjusted. Alternatively, it is possible to take into account the decreasing intensity of the light source when evaluating the captured measured values of the value document and to computationally eliminate it retrospectively. It is assumed here that the captured measured values decrease in proportion to the decreasing light intensity of the light source. Retrospective computational elimination is difficult, however, if several mutually adjacent light sources are employed, which are switched on simultaneously to illuminate the value document and whose emitted light is possibly even spatially superimposed on the value document. This is because the measured values captured by the respective photodetector from a value document then depend on the light intensity of several light sources, the emitted light intensity of which can develop differently over the course of the service life.

SUMMARY

It is therefore an object of the invention to specify a solution for the retrospective correction of the value-document measured values captured by the photodetectors in the event that the light intensity emitted by several light sources develops differently over the course of the service life of the light sources.

To check a value document, it is introduced into a capture range of an optical sensor that is adapted to check value documents. The optical sensor comprises a photodetector line, which has a number K of several detector elements arranged next to one another, which are configured to detect the intensity of the light in each case emanating from a detection region of the value document. Moreover, the optical sensor comprises a line of light sources, which has a number N of several light sources arranged next to one another, which are configured to illuminate the value document. Moreover, the optical sensor has a monitor detector line, which has several photosensitive monitor elements (e.g. configured as photodetectors) arranged next to one another, e.g. a number of N monitor elements. However, more than N monitor elements could also be employed. Each of the monitor elements is assigned to one of the light sources, preferably precisely one of the light sources, and is configured to detect the intensity of the light emitted by this light source and impinging on the respective monitor element. For example, in the optical sensor there is a 1:1 assignment between the light sources and the monitor elements, so that there is exactly one monitor element present for each light source.

At a point in time before the value documents are checked, a self-test of the optical sensor is carried out, which is carried out, for example, by a control device of the optical sensor. During the self-test, the N light sources are switched on and the respective light intensity $MS_j$ (j=1 . . . N) of the light source assigned to the respective monitor element, which impinges on the respective monitor element at the time of the self-test, is detected with the aid of the N monitor elements. As part of the self-test, the light intensities $MS_j$ (j=1 . . . N) detected by the monitor elements at the time of the self-test can be N) be verified. During the verification it is noted, for example, whether the light intensity $MS_j$ (j=1 . . . N) detected by the respective monitor element is sufficient to check the value document, e.g. by comparing with a threshold, and an error message is output if a monitor element has detected an intensity that is too low during the self-test.

To optically check a value document, the value document to be checked is introduced into the capture range of the optical sensor, so that the value document can be illuminated by the light from the light sources and the light emanating from the value document can be detected by the detector elements. The light emanating from the value document can be remitted illumination light or illumination light transmitted through the value document, but it can also be luminescent light which the value document emits as a result of illumination suitable for optical excitation, which the light sources possibly emit.

In particular, the value document is transported past the optical sensor along a transport direction and a detection region of the value document is introduced into the capture range in each case. The photodetector line is arranged transversely, e.g. in a manner perpendicular or inclined, to the transport direction of the value document, in which the respective value document is transported past the optical sensor for its check. Detection regions of the value document that are arranged adjacently along the transport direction are captured temporally one after the other. The successively captured detection regions of the value document can each correspond to a pixel of an image recorded by the photodetector line.

The N light sources of the optical sensor are switched on simultaneously in order to illuminate the respective value document introduced into the capture range with the light of the light sources. The N light sources can be all or just a subset of the light sources contained in the line of light sources (possibly light sources at the edge of the line are not utilized). Measured values of the respective value document are recorded by means of the detector elements, said measured values corresponding to the light intensity emanating from the respective value document as a result of the illumination. The K detector elements of the photodetector line each record at least one measured value $D_i$ (i=1 . . . K) of the value document. The K detector elements can be all or just a subset of the detector elements contained in the photodetector line (possibly elements on edge of the line are not utilized). For example, the respective detector element detects only one measured value $D_i$ of a specific value document region or several measured values $D_i$, for example when scanning the value document along the transport direction. Switching on the light sources and recording the measured values of the value document is e.g. caused by the control device of the optical sensor, which drives the light sources or the detector elements accordingly. The respective measured value can be detected simultaneously with the illumination (in the case of a reflectance measurement or transmission measurement) or after the end of an illumination pulse of the light sources (in the case of a luminescence measurement).

The recorded measured values $D_i$ (i=1 ... K) are corrected with the aid of the light intensities $MS_j$ (j=1 ... N) detected by the monitor elements at the time of the self-test, in order to take into account, in particular to retrospectively computationally eliminate, any change in the light intensity emitted by the light sources that occurs over the course of the service life of the light sources. During the correction, the measured values $D_i$ of the respective detector element are each corrected, in particular multiplied, with a correction factor $FK_i$, which is computed individually for the respective detector element, namely based on the light intensities $MS_j$ detected by several of the monitor elements at the time of the self test, e.g. based on the light intensities $MS_j$ detected by at least two of the monitor elements at the time of the self-test. The respective value document is checked based on the measured values $D_i^*$ corrected with the aid of the respective correction factor $FK_i$.

The computing of the corrected measured values $D_i^*$ (i=1 ... K) and the checking of the value document can be carried out by an evaluation device. The evaluation device is connected to the photodetector line or the detector elements in order to receive the detected measured values $D_i$ (and possibly measured values $DA_i$ of a calibration medium, see below) of the value document. The evaluation device can output the result of the value document check to an operator and/or to a value document processing apparatus in which the optical sensor is installed.

The correcting of the measured values $D_i$ of the value document with the aid of the light intensities MS (j=1 ... N) detected by the monitor elements at the time of the self-test is carried out in order to correct or to retrospectively computationally eliminate from the detected measured values a change in the light intensity emitted by the light sources over the course of the service life of the light sources. By employing several monitor elements, which are assigned to different light sources, it is achieved that the light intensity emitted in each case by the individual light sources is captured individually during the self-test. By correcting the measured values of the value document with the aid of the light intensities $MS_j$ (j=1 ... N) detected by the monitor elements at the time of the self-test it can therefore also be taken into account if the light intensity emitted by the various light sources develops differently.

For example, a correction table is set up during the self-test, in which the correction factors $FK_i$ computed individually for the detector elements of the photodetector line are entered. The correction factor $FK_i$ can be computed for each detector element of the photodetector line or only for those detector elements that actually capture the light emanating from the checked value document. In the latter case, a computation of the correction factors is dispensed with e.g. for those detector elements that are at the edge of the photodetector line.

In particular, the correction factor $FK_i$ is computed individually for the respective i-th detector element based on the light intensities $MS_j$ (j=1 ... N) detected by the monitor elements at the time of the self-test, in each case taking into account a proportional factor $A_{ij}$, which specifies which proportion of the light intensity emitted by the respective j-th light source (j=1 ... N) impinges on the respective i-th detector element (i=1 ... K) due to the optical beam path between the light sources and the detector elements. The respective light intensities $MS_j$ (j=1 ... N) detected by the monitor elements at the time of the self-test are each incorporated in the respective i-th correction factor $FK_i$ (i=1 ... K) in a manner limited by the proportional factor $A_{ij}$ (j=1 ... N). To compute the respective correction factor $FK_i$ for several or all of the N light sources, the respective proportional factors $A_{ij}$ are multiplied with the light intensities $MS_j$ (j=1 ... N) detected by the monitor elements at the time of the self-test.

For example, the proportional factors $A_{ij}$ can be determined empirically before the value document check. In particular, a reference area (e.g. a calibration medium with homogeneous optical properties) instead of the value document is placed in the capture range of the detector elements, the light sources are switched on individually one after the other to illuminate the reference area and the light intensity emanating from the reference area and impinging on the detector elements is detected in each case.

Alternatively, the proportional factors $A_{ij}$ can be computed before the value document check by means of a numerical simulation based on a model of the optical beam path from the N light sources to the K detector elements. The numerical simulation is carried out before the value document check, e.g. carried out by the manufacturer of the sensor. The result of this numerical simulation is then employed to compute the correction factors $FK_i$ for the measured values $D_i$, which the detector elements recorded from the respective value document. In the numerical simulation of the optical beam path from the N light sources to the K Detector elements a transfer matrix A is computed, for example, the matrix elements of which correspond to the proportional factors $A_{ij}$, (i=1 ... K, j=1 ... N). The transfer matrix A, in particular the matrix elements of the transfer matrix A corresponding to the proportional factors $A_{ij}$ (i=1 ... K, j=1 ... N), are then employed to correct the measured values $D_i$.

When computing the respective correction factor $FK_i$ of the respective i-th detector element (i=1 ... K), for several or all of the N light sources, the proportional factors $A_{ij}$ are multiplied with the light intensities $MS_j$ (j=1 ... N) detected by the monitor elements at the time of the self-test, in order to compute for each of the K (i=1 ... K) detector elements the correction factor $Fk_i$, which is employed to correct the measured value $D_i$ of the respective i-th detector element.

Before the self-test of the optical sensor, a calibration procedure of the optical sensor is preferably carried out in order to check the individual detector elements of the optical sensor for their possibly different sensitivity. The calibration procedure is carried out at an earlier point in time, before the self-test, e.g. before the delivery of the optical sensor by the manufacturer of the optical sensor. However, it can also be carried out additionally or alternatively after the delivery of the optical sensor to a customer, e.g. by the manufacturer's service personnel. During the calibration procedure, a calibration medium with homogeneous optical properties is brought into the capture range of the optical sensor and the light sources are switched on simultaneously in order to illuminate the calibration medium. During the calibration procedure, the monitor elements of the optical sensor each detect a light intensity $MA_j$ (j=1 ... N), which corresponds to the light intensity emitted by the respective light source during the calibration procedure. During the calibration procedure, the detector elements of the optical sensor each detect a light intensity $DA_i$ (i=1 . . . K) emanating from the calibration medium. In particular, the control device of the optical sensor can be adapted to cause the detections required during the calibration procedure, e.g. the detection of the light intensities $MA_j$ (j=1 . . . N) by the monitor elements and/or the detection of the light intensity $DA_i$ (i=1 . . . K) by the detector elements.

To compute the respective correction factor $FK_i$ of the respective i-th detector element (i=1 . . . K), the light intensities $MA_j$ (j=1 . . . N) of the light sources are then preferably also considered, which the monitor elements have detected within the scope of the calibration procedure. The light intensities $MS_j$ (j=1 . . . N) detected by the monitor elements at the time of the self-test are put in mutual relation with these light intensities $MA_j$ (j=1 . . . N) in order to ascertain quantitatively the change in the light intensity of the light sources since the calibration procedure.

To correct the measured values $D_i$ of the value document, the respective measured value $D_i$ is multiplied with the respective correction factor $FK_i$ (i=1 . . . K). In a first embodiment example, to compute the respective correction factor $FK_i$ for several or all of the N light sources, the respective proportional factors $A_{ij}$ are multiplied with the respective light intensities $MS_j$ (j=1 . . . N) detected by the monitor elements at the time of the self-test and the results of these multiplications are summed up to compute the respective correction factor $FK_i$.

In a second embodiment example, to compute the respective correction factor $FK_i$ of the respective i-th detector element (i=1 . . . K), for several or all of the N light sources, the ratio is formed in each case between the light intensity $MS_j$ (j=1 . . . N) detected by the monitor elements at the time of the self-test and the light intensity $MA_j$ (j=1 . . . N) detected by the monitor elements at an earlier point in time, in particular at the time of the calibration procedure. The respective ratio $MS_j/MA_j$ is multiplied with the respective proportional factor $A_{ij}$ (j=1 . . . N) and the results of these multiplications are summed up in order to compute the respective correction factor $FK_i$.

The light intensities $DA_A$ detected from the calibration medium by the detector elements within the scope of the calibration procedure can, if necessary, also be employed to correct the measured values $D_i$ (i=1 . . . K) detected from the value document, wherein the measured values $D_i$ of the respective detector element recorded from the value document are multiplied with a further correction factor $F_i$, which corresponds to the reciprocal of the light intensity $DA_i$ detected by means of the respective detector element from the calibration medium during the calibration procedure of the optical sensor.

Apart from the aging of the light sources over the course of the service life, a temperature dependency of the monitor elements can also be corrected when correcting the measured values of the value document (e.g. a temperature-dependent sensitivity). For example, a temperature of the monitor elements at the time of the self-test and possibly also a temperature of the monitor elements at the time of the calibration procedure can be measured with the aid of a temperature sensor installed in the optical sensor. To correct the temperature dependency of the monitor elements, the light intensities MS detected by the monitor elements at the time of the self-test can be multiplied with a temperature-dependent factor, which is determined based on the temperature of the monitor elements at the time of the self-test.

Analogously, the light intensities MA detected by the monitor elements at the time of the calibration procedure can be multiplied with a temperature-dependent factor, which is ascertained based on the temperature of the monitor elements at the time of the calibration procedure.

The value documents that are checked with the method according to the invention are, for example, banknotes, tickets, vouchers, etc.

BRIEF DESCRIPTION OF THE DRAWINGS

The invention will hereinafter be described by way of example with reference to the accompanying drawings. The figures are described as follows.

DETAILED DESCRIPTION OF VARIOUS EMBODIMENTS

Figure 1:
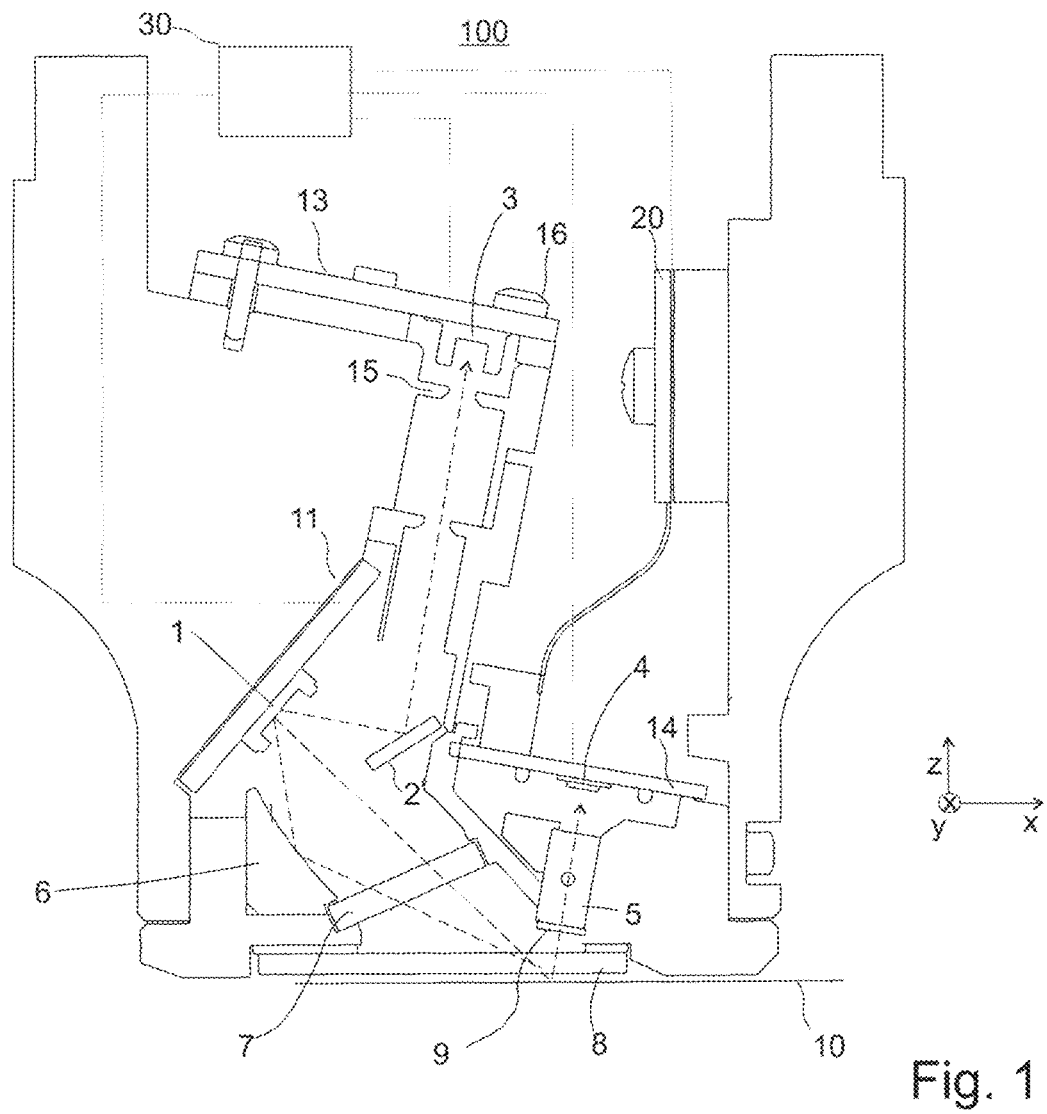
FIG. 1 structure of an optical sensor for checking the value documents.

FIG. 1 shows the structure of an optical sensor 100 adapted to check value documents, which can be installed e.g. in a value document processing apparatus. To illuminate a value document 10 introduced into the capture range of the optical sensor 100, a line of light sources is employed, which has several light sources 1 arranged next to one another along the y-direction on a light source mount 11, for example N=12 light sources. The light sources 1 are e.g. UV LEDs, which are suitable for luminescence excitation of the value document. The light emitted by the light sources 1 is directed via a mirror 2 onto photo-sensitive monitor elements 3 (e.g. photodiodes), by means of which the light intensity emitted by the light sources 1 can be verified, which usually decreases over the service life of the light sources. There is exactly one monitor element 3 for each of the N light sources 1 (e.g. N=12 monitor elements). It is achieved by apertures 15 that one monitor element 3 each captures only the light of exactly one of the light sources 1: the monitor element $3_1$ captures the light from light source $1_1$, monitor element $3_2$ captures the light from light source $1_2$, etc. The monitor elements 3 are attached to a monitor mount $1_3$.

As an alternative to reflection on a mirror 2, the monitor elements 3 could also be arranged in the radiation region of the respective light source 1 in such a manner that they directly capture part of the light emitted by the light sources. Or a partly transmissive mirror could be arranged between the light sources and the value document, which allows most of the illumination light to pass through and reflects part of the illumination light onto the monitor elements. Alternatively, the monitor elements could also detect the illumination light from the light sources scattered back on a reference area.

The light emitted by the light sources 1 is directed partly directly, partly via an elliptical mirror 6 onto the value document 10 to be checked and is transmitted through the measuring window 8 of the optical sensor 100 and through a spectral filter 7, which blocks the visually visible portion of the illumination light. In addition, a further spectral filter of this type could also be provided in the beam path in front of the monitor elements 3 in order to also block the visually visible portion of the illumination light here. Alternatively, the spectral filter 7 could also be arranged immediately behind the light sources in order to spectrally filter both the light impinging on the value document and the light impinging on the monitor elements 3.

The luminescent light emanating from the value document 10 is imaged by a line of Selfoc lenses 5 supplied with a UV-blocking filter onto several detector elements 4 of a line of photodetectors, which are arranged next to one another along the y-direction on a detector element mount 14 and which has e.g. K=112 detector elements. Only a single photodetector line can be employed on which the luminescence light is imaged. With the aid of additional lenses, the luminescence light can also be imaged onto several photodetector lines which are offset from one another along the x-direction and which capture different spectral ranges of the luminescence light and have corresponding spectral filters. Alternatively, several photodetector lines of a two-dimensional image sensor can also be employed, onto which the light emanating from the value document can be imaged.

The value document 10 can be introduced statically into the capture range of the optical sensor 100 for its check. However, the value document is preferably transported past the optical sensor along the x-direction in order to successively scan the various sections of the value document with the optical sensor. The transport past is achieved e.g. by means of appropriate means of transport, e.g. a conveyor belt and/or transport rollers, which are employed in a value document processing apparatus for transporting the value documents.

A control device 30 of the optical sensor 100 is connected to the light sources 1, the monitor elements 3 and the detector elements 4 and has appropriate hardware and software which ensures that the light sources 1 are switched on simultaneously and the detector elements 4 are caused simultaneously and/or or after the illumination to capture luminescence measured values $D_i$ of the value document 10. The measured values $D_i$ (i=1 . . . K) of the value document captured by the detector elements 4 are transmitted to an evaluation device 20 connected to the detector elements.

The control device 30 is adapted to carry out a self-test of the optical sensor. The self-test can be carried out at a point in time immediately before the value documents are checked, e.g. when starting the value document processing apparatus, or in the gap between two value documents to be checked transported past the sensor. During the self-test, the control device causes the N light sources 1 to be switched on simultaneously and the respective light intensity $MS_j$ (j=1 . . . N) of the light source 1 assigned to the respective monitor element to be detected. For example, during the self-test, the light intensities $MS_j$ (j=1 . . . N) detected by the monitor elements at the time of the self-test are N) are verified for whether they exceed a specific threshold value, which is required to illuminate the value document, e.g. for the optical excitation of a measurable luminescence. The control device 30 is also connected to the evaluation device 20 in order to transmit the light intensities $MS_j$ (j=1 . . . N) detected by the monitor elements at the time of the self-test to the evaluation device 20, and possibly also the light intensities $MA_j$ (j=1 . . . N) of a calibration medium detected by the monitor elements during the calibration procedure.

The evaluation device 20 corrects the measured values $D_i$ of the respective value document with the aid of correction factors $FK_i$, in which the light intensities $MS_j$ (j=1 . . . N) detected by the monitor elements 3 at the time of the self-test are incorporated, in order to compute corrected measured values $$D_i^* = FK_i \cdot D_i (i=1 \ldots K) \tag{1}$$

The evaluation device 20 subsequently checks the value document by means of the corrected measured values $D_i^*$, e.g. its authenticity, condition or the type of value document. To check the value document, the corrected measured values $D_i^*$ are e.g. compared with at least one reference value that is expected for the respective value document or the respective section of the value document. The corrected measured values can also be summarized over a section (region of interest, ROI) of the value document, e.g. be averaged before the comparison with the respective reference value is carried out.

When manufacturing the optical sensor, N light sources that are as identical as possible are preferably selected, which hardly differ in their emitted light intensity, and the photodetector line is preferably selected in such a manner that the sensitivities of the individual detector elements hardly differ. In this case, a correction of the measured values $D_i$ alone with the aid of the factors $FK_i$ according to formula (1) is preferred.

Otherwise, if it is unavoidable in the manufacture of the optical sensor that the individual light sources and/or the individual detector elements are different, before the delivery of the optical sensor, the sensor manufacturer preferably carries out a calibration procedure for the optical sensor, in which the possibly different emission intensities of the light sources and the possibly different sensitivities of the detector elements are checked and quantitatively determined. During the calibration procedure, a calibration medium with homogeneous optical properties, e.g. a homogeneous white surface, is introduced into the capture range of the optical sensor 100. Then the N light sources 1 are switched on simultaneously in order to illuminate the calibration medium and the reflected light intensity $DA_i$ (i=1 . . . K) emanating from the calibration medium is detected by means of the detector elements 4 of the optical sensor.

If it turns out during the calibration procedure that the individual light sources 1 and/or the individual detector elements 4 are actually significantly different, the measured values $D_i$ of the value documents are subjected to a further correction by means of a further correction factor which is likewise multiplied with the measured values $D_i$:

$$D_i^* = F_i \cdot Fk_i \cdot D_i \tag{2}$$

The further correction factor $F_1$ results from the measured values of the detector elements $DA_i$ captured from the calibration medium during the calibration procedure according to the formula $$F_i = c/DA_i \tag{3}$$

wherein a fixed numerical value is assumed for c.

During the calibration procedure, the light intensities $MA_j$ (j=1 . . . N) emitted by the N light sources 1 and impinging on the N monitor elements 3 are also detected with the aid of the monitor elements 3. When determining the correction factor $FK_i$, these are employed as benchmark values for the light intensities $MS_j$ (j=1 ... N) emitted by the N light sources 1 during the self-test and incident on the N monitor elements 3.

If necessary, the calibration procedure can also be repeated from time to time after delivery of the optical sensor (e.g. monthly or every six months) in order to capture the change in the light intensity of the light sources over the course of the service life. However, since the calibration procedure is costly (use of service personnel), instead of repeating the calibration procedure frequently, it is advantageous to utilize a self-test of the optical sensor as an alternative to capture the change in the light intensity of the light sources over the course of the service life. During the self-tests of the optical sensor, the light intensities $MS_j$ (j=1 ... N) of the light sources 1 incident on the monitor elements 3 are detected regularly (e.g. before each start of the value document processing apparatus). Since the self-test is carried out closely in time to the value-document check, the light intensity of the respective light source noted during the respective self-test corresponds fairly exactly to the light intensity of the respective light source 1 present during the value-document check.

In the following, the determination of the correction factors $FK_i$ for the K detector elements (i=1 ... K) with the aid of the light intensities $MS_j$ (j=1 ... N) detected by the monitor elements 3 at the time of the self-test is described. The correction factors can be determined within the scope of the self-test, e.g. immediately before the check of the value documents.

To determine the correction factors $FK_i$ for the K detector elements (i=1 ... K) it is determined individually for each detector element 4 what proportion of the light intensity emitted by the respective j-th light source (j=1 ... N)—considering the optical beam path between the light sources and the detector elements—impinges on the respective i-th detector element (i=1 ... K). Each of these proportions is represented by a proportional factor $A_{ij}$.

Into the proportional factor $A_{ij}$, j=1 ... N, there are incorporated e.g. the position of the respective j-th light source along the line of light sources and the position of the respective i-th detector element along the photodetector line and/or their relative position or their distance along the line direction (y-direction), as well as the radiation angle of the light sources (approximately the same for all light sources), the angle of reception for the detector elements (approximately the same for all detector elements) and the distance of the light sources 1 and of the detector elements 4 from the value document plane of a value document introduced into the capture range of the optical sensor.

Figure 2:
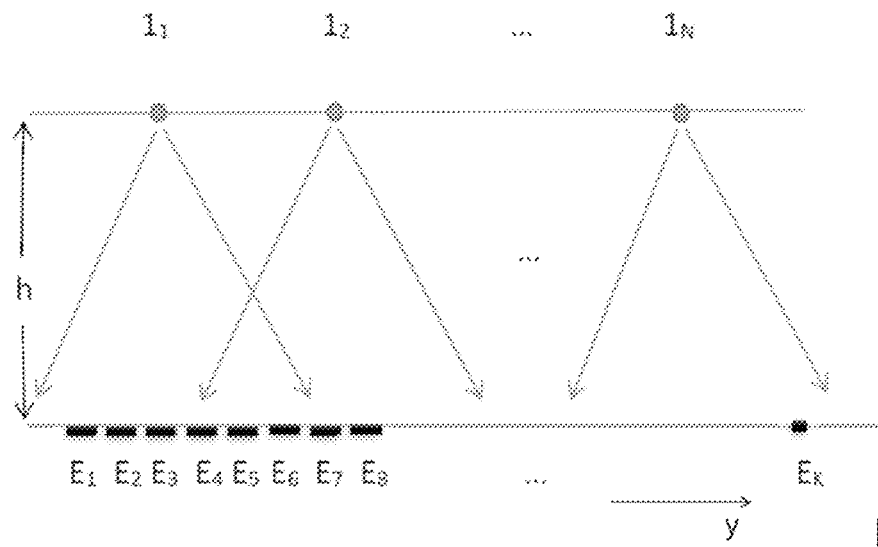
FIG. 2 schematic sketch of the distribution of the illumination light emitted by the light sources in the value document plane, FIG. 3 gray level representation of the proportional factors $A_{ij}$ determined with the transfer matrix, FIG. 4 light intensities detected by the monitor elements at the time of the calibration procedure ($MA_j$) and at the time of the self-test ($MS_j$), FIG. 5 correction factors $Fk_i$ computed for the i=1 . . . K detector elements, FIG. 6 measured values $D_i$ of a value document recorded by the i=1 . . . K detector elements and corrected measured values $D_i^* = FK_i \cdot D_i$.

FIG. 2 shows an example of the distribution of the illumination light emitted from the light sources $\mathbf{1}_1$, $\mathbf{1}_2$, ..., $\mathbf{1}_N$. The capture ranges $E_1$, $E_2$, ..., $E_K$ of the individual detector elements (i=1 ... K) are entered schematically in the value document plane, which result from the optical imaging by means of the line of Selfoc lenses 5. It can be seen that the light contribution radiated by a light source arranged on the left edge of the line of light sources (e.g. the light source $\mathbf{1}_1$) onto the capture ranges (e.g. $E_1$, $E_2$, $E_3$) of the detector elements 4 located at the left edge of the photodetector line is much larger than its light contribution to the capture range (e.g. $E_K$) of a detector element 4 located on the right edge of the photodetector line. The proportional factors $A_{11}$, $A_{21}$, $A_{31}$ of the light source $\mathbf{1}_1$ on the detector elements located on the left edge of the photodetector line are correspondingly large compared to its proportional factor $A_{K1}$ on the detector element located on the right edge of the photodetector line.

The proportional factors $A_{ij}$ can be computed quantitatively by means of a numerical simulation based on a model of the optical beam path, in which the optical beam path from the N light sources of the optical sensor to the K detector elements of the optical sensor is modeled.

For the optical simulation, in the case of the optical sensor 100 it is assumed, for example, that the light sources have Lambertian radiation, the distance h of the light sources 1 from the value document plane is 30 mm, the light sources 1 are at a distance of 10.5 mm from one another and the detector elements 4 are at a distance of 1 mm from one another (in the y-direction). In the numerical simulation, e.g. a transfer matrix A is computed, the matrix elements of which have the proportional factors $A_{ij}$, (i=1 ... K, j=1 ... N).

Figure 3:
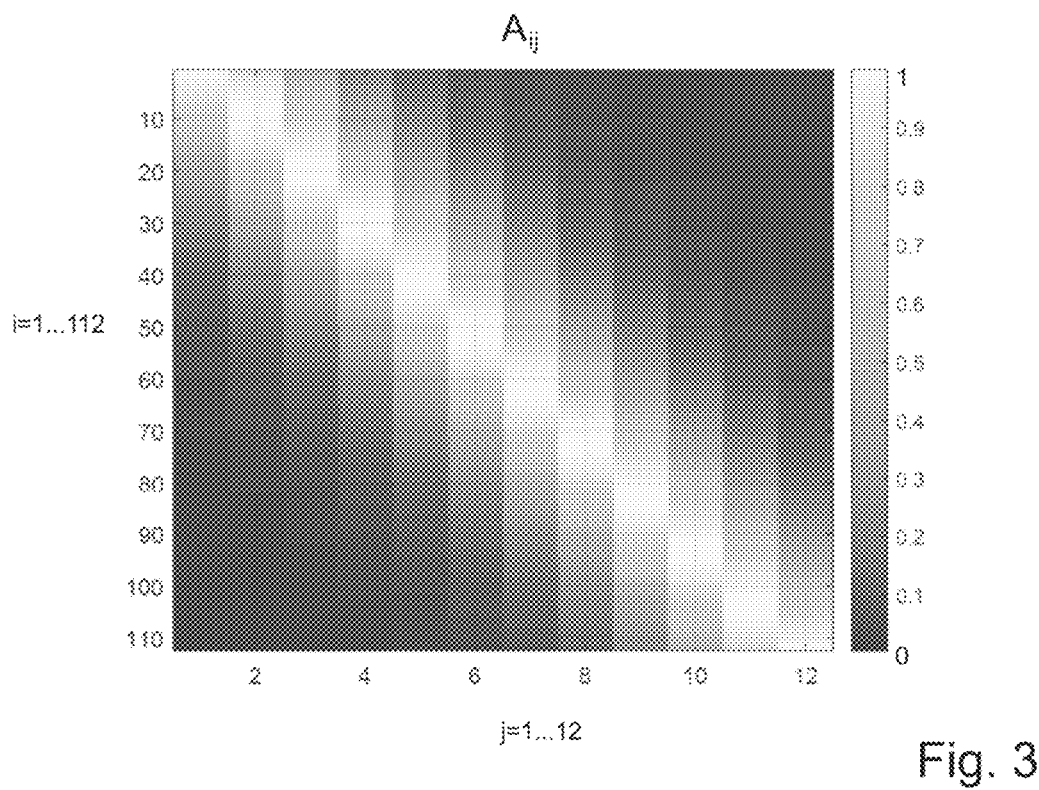

The proportional factors $A_{ij}$, which were computed by the numerical simulation of the optical beam path of the optical sensor 100, are shown in FIG. 3 in the form of gray scale values. The proportional factors $A_{ij}$ are represented for the N=12 (j=1 ... 12) light sources from left to right and for the K=112 detector elements (i=1 ... 112) from top to bottom. As to be expected from the above description of FIG. 2, the largest proportional factors $A_{ij}$ result in the "diagonal" of FIG. 3. As an alternative to the numerical simulation of the optical beam path, the proportional factors $A_{ij}$ can also be determined by measuring the individual light intensity emitted by the light sources and impinging on the respective detector element.

The illumination intensity $B_i$ decisive for the respective i-th detector element (i=1 ... K), is generally obtained by summing up the light intensities $L_j$ (j=1 ... N) emitted by the light sources, each weighted by the proportional factor $A_{ij}$, to $$B_i = \Sigma_{j=1}^{N} A_{ij} \cdot L_j \qquad (4)$$

and in matrix notation $$\begin{pmatrix} B_1 \\ B_2 \\ \cdots \\ B_K \end{pmatrix} = \begin{pmatrix} A_{1,1} & \cdots & A_{1,N} \\ \vdots & \ddots & \vdots \\ A_{K,1} & \cdots & A_{K,N} \end{pmatrix} \cdot \begin{pmatrix} L_1 \\ L_2 \\ \cdots \\ L_N \end{pmatrix}. \qquad (5)$$

Assuming that the monitor elements each only detect a specific, fixed proportion 1/ß of the light intensity emitted by the light sources, the light intensity $L_j$ (j=1 ... N) emitted by the light sources can be computed from the light intensities $MS_j$ detected by the monitor elements in the self-test by $L_j = \beta \cdot MS_j$. At the time of the calibration procedure, $L_j = \beta \cdot MA_j$ is assumed accordingly.

For the time of the self-test, there results the illumination intensity $BS_i$ relevant for the respective i-th detector element (i=1 ... K) by summing up the light intensities $MS_j$ (j=1 ... N) detected by the monitor elements during the self-test, each weighted by the proportional factor $A_{ij}$ $$BS_i = \Sigma_{j=1}^{N} A_{ij} \cdot \beta \cdot MS_j \qquad (6)$$

and for the time of the calibration procedure there results accordingly $$BA_i = \Sigma_{j=1}^{N} A_{ij} \cdot \beta \cdot MA_j \qquad (7)$$

In a first embodiment example, the correction factors $FK_i$ of the individual detector elements (i=1 ... K) are computed from the two illumination intensities $BS_i$ and $BA_i$ according to the following formula:

$$FK_i = \frac{BA_i}{BS_i} = \frac{\sum_{j=1}^{N} A_{ij} \cdot MA_j}{\sum_{j=1}^{N} A_{ij} \cdot MS_j} \quad \text{wherein } i = 1 \ldots K, j = 1 \ldots N. \tag{8}$$

Accordingly, the respective correction factor $FK_i$ results from the quotient of the illumination intensity $BA_i = \sum_{j=1}^{N} A_{ij} \cdot MA_j$ present during the calibration procedure and the illumination intensity $BS_i = \sum_{j=1}^{N} A_{ij} \cdot MA_j$ present during the self-test. The computation of the correction factors $FK_i$ according to the formula (8) is an approximation in which it is assumed for the sake of simplicity that all monitor elements have the same sensitivity and the optical image on each of the monitor elements is the same.

In a second embodiment example, the correction factors $FK_i$ of the individual detector elements (i=1 . . . K) are computed according to the following formula:

$$FK_i = \frac{\sum_{j=1}^{N} A_{ij}}{\sum_{j=1}^{N} A_{ij} \cdot \frac{MS_j}{MA_j}}, \quad \text{wherein } i = 1 \ldots K, j = 1 \ldots N. \tag{9}$$

The computation of the correction factors $FK_i$ according to the formula (9) is also an approximation, wherein it is assumed that the light sources 1 emit approximately the same light intensity at the time of the calibration procedure.

The correction factors $FK_i$ can either be computed by the control device within the scope of the self-test and forwarded thereby to the evaluation device 20. However, the correction factors $FK_i$ can also first be computed by the evaluation device, which receives the respective light intensities $MS_j$ (j=1 . . . N) detected during the self-test from the control device. After the correction factors $FK_i$ have been determined according to formula (8) or (9) from the illumination intensities $MS_j$ and $MA_j$ (j=1 . . . N) detected during the calibration procedure and the self-test while employing the proportional factors $A_{ij}$ shown in FIG. 3, the evaluation device 20 can carry out a correction of the measured values $D_i$ (i=1 . . . K) of a value document according to formula (1).

Figure 4:
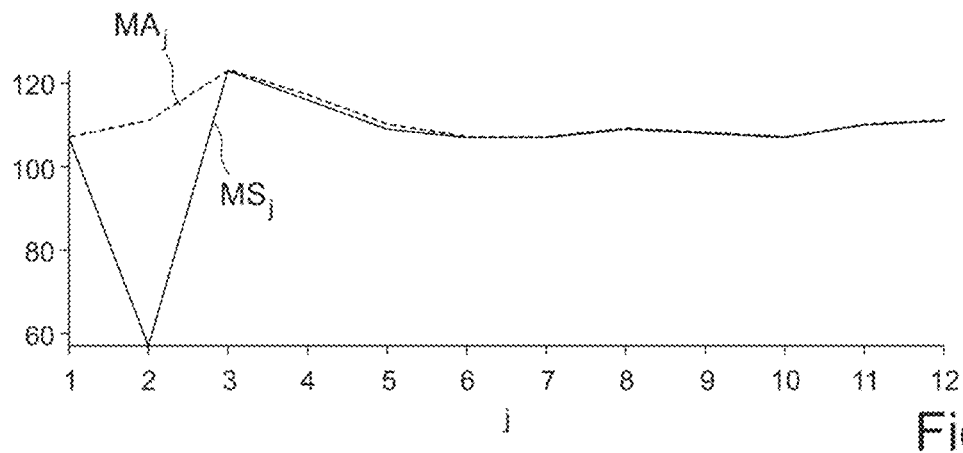

As an example, the illumination intensities $MS_j$ and $MA_j$ (j=1 . . . N) for all N=12 light sources 1 detected by the N=12 monitor elements 3 during the calibration procedure and during a self-test of the optical sensor are represented in FIG. 4. During the self-test, a greatly reduced light intensity of the second light source (j=2) was noted, which is reduced by about half compared to the light intensity measured earlier during the calibration procedure. From these values for $MS_j$ and $MA_j$ (j=1 . . . N) there result (while employing the proportional factors $A_{ij}$ shown in FIG. 3) from formula (8) or (9) the correction factors $FK_i$ represented in FIG. 5 for all K=112 detector elements 4.

Figure 5:
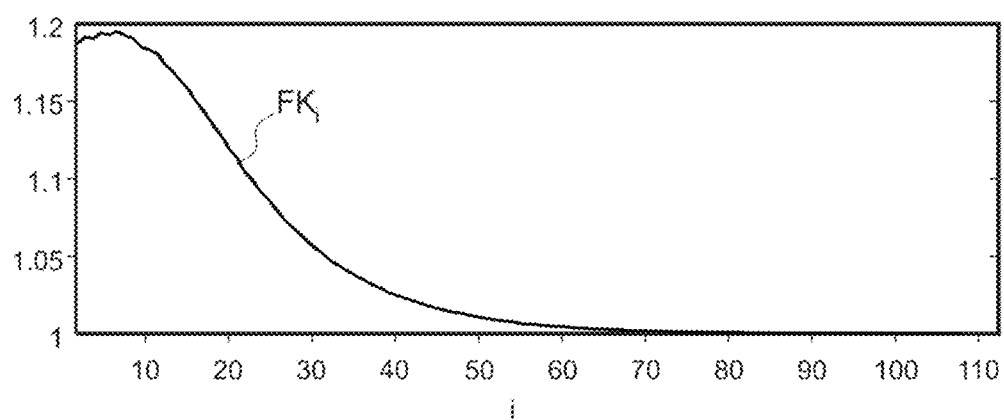
Figure 6:
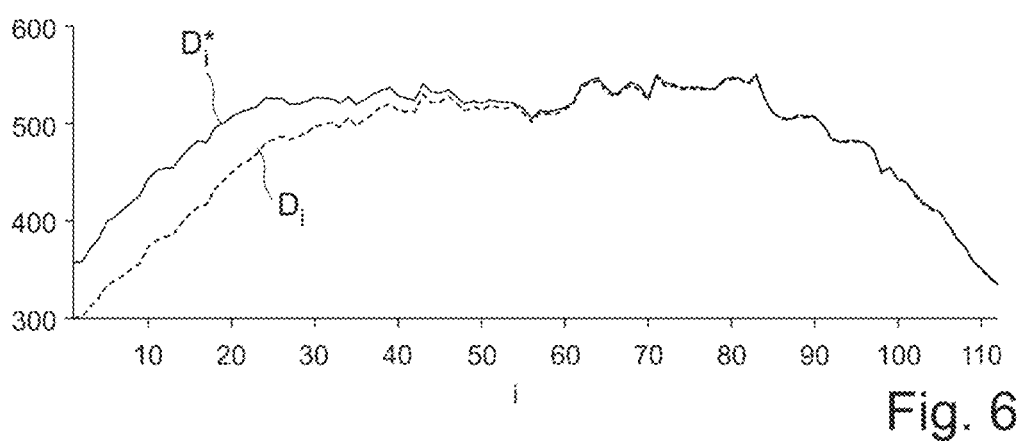

With the correction factors $FK_i$ from FIG. 5, the measured values $D_i$ of the value document captured by the individual detector elements 4 (cf. FIG. 6) are corrected according to formula (1), e.g. multiplied, in order to compute the changed light intensity over the course of the service life, in particular the light intensity of the second light source, which has been strongly reduced since the calibration procedure, from the measured values detected. FIG. 6 shows the measured values $D_i^* = FK_i \cdot D_i$ corrected in the example under consideration. For the detector elements i=1 to around i=45, this results in a clear upward correction of the measured values $D_i$.

In addition to the aging of the light sources 1 over the course of the service life, the temperature dependency of the monitor elements 3 can also be corrected if necessary. For this purpose, the temperature of the monitor elements at the time of the self-test $T_S$ is measured with the aid of a temperature sensor 16 installed near the monitor elements 3 (e.g. on the monitor mount 13) and taken into account when correcting the measured values $D_i$. If the temperature of the monitor elements is always approximately the same at the time of a calibration procedure carried out by the sensor manufacturer, it is not necessary to take the temperature measured at the time of the calibration procedure into account. Otherwise, if a calibration procedure takes place with a greatly changed temperature of the monitor elements, the temperature of the monitor elements $T_A$ measured during the calibration procedure is preferably also deposited in the optical sensor and taken into account when correcting the measured values $D_i$.

For example, a table can be stored in the evaluation device 20 of the optical sensor, in which a correction factor t as a function of the temperature T is assigned in each case to different temperatures T of the monitor elements. To correct the temperature dependency of the monitor elements 3, the light intensities $MS_j$ detected by the monitor elements at the time of the self-test are then replaced in the equations (8) or (9) by $MS_j' = t(T_S) \cdot MS_j$, wherein $t(T_S)$ results from the temperature $T_S$ measured during the self-test according to the above-mentioned table. It is assumed that the correction factors $t(T_S)$ are approximately the same for all monitor elements 3. Analogously, the light intensities $MA_j$ detected by the monitor elements at the time of the calibration procedure can be replaced by $MA_j' = t(T_A) \cdot MA_j$, wherein $t(T_A)$ results from the temperature $T_A$ measured during the calibration procedure according to the above-mentioned table. Alternatively, the measured values $D_i$ of the value document captured by the individual detector elements 4 could simply be multiplied with an additional factor $t(T_A)/t(T_S)$.

Moreover, the temperature dependency of the detector elements can optionally be measured during the self-test with corresponding additional temperature sensors and—if the detector elements have a correspondingly great temperature dependency—any temperature changes since the calibration procedure can be taken into account when correcting the measured values $D_i$.

The invention claimed is:

1. A method for checking a value document introduced into a capture range of an optical sensor, wherein the optical sensor has:
   a photodetector line, which has a number K of several detector elements arranged next to one another, which are configured to detect in each case an intensity of light emanating from a detection region of the value document,
   a line of light sources, which has a number N of several light sources arranged next to one another, which are configured to illuminate the value document,
   a monitor detector line, which has several photosensitive monitor elements arranged next to one another, wherein each monitor element is assigned to one of the light sources and is configured to detect an intensity of light emitted by the one of the light sources and impinging on the respective monitor element,
   wherein in the method the following steps are carried out:
   carrying out a self-test of the optical sensor at a point in time before the value document is checked, wherein the N light sources are switched on during the self-test and a respective light intensity $MS_j$ of the light source assigned to the respective monitor element is detected with aid of the monitor elements, said light intensity impinging on the respective monitor element at the time of the self-test, in order to verify the light intensities $MS_j$ detected by the monitor elements at the time of the self-test, wherein j=1 . . . N, introducing a value document into the capture range of the optical sensor, simultaneously switching on the N light sources in order to illuminate the value document introduced into the capture range with the light of the light sources, and recording measured values of the respective value document by means of the detector elements, wherein the recorded measured values correspond to a light intensity emanating from the respective value document as a result of the illumination and wherein the K detector elements of the photodetector line each record at least one measured value $D_i$ of the value document, wherein i=1 . . . K, correcting the measured values $D_i$ based on the light intensities $MS_j$ detected by the monitor elements at the time of the self-test, wherein the at least one measured value $D_i$ of the respective detector element is corrected during the correction in each case with a correction factor $FK_i$ that is computed individually for the respective detector element based on the light intensities $MS_j$ detected by several of the monitor elements at the time of the self-test, and checking the value document based on the measured values corrected with the aid of the respective correction factor $FK_i$.

2. The method according to claim 1, wherein the respective light intensities $MS_j$ detected by the monitor elements at the time of the self-test, each limited by a proportional factor $A_{ij}$, are computationally included in the respective correction factor $FK_i$, which indicates which proportion of the light intensity emitted by the respective light source impinges on the respective detector element due to the optical beam path from the light sources to the detector elements.

3. The method according to claim 1, wherein proportional factors $A_{ij}$ are determined empirically before the value document check, by a reference area being placed in the capture range of the detector elements instead of the value document, the light sources being switched on one after the other in order to illuminate the reference area and the light intensity emanating from the reference area and impinging on the detector elements being detected in each case.

4. The method according to claim 1, wherein the proportional factors $A_{ij}$ are computed before the value document check by means of a numerical simulation based on a model of the optical beam path from the N light sources to the K detector elements.

5. The method according to claim 4, wherein in the numerical simulation of the optical beam path from the N light sources to the K detector elements, a transfer matrix is computed, the matrix elements of which correspond to the proportional factors $A_{ij}$, and the transfer matrix, in particular the matrix elements of the transfer matrix A corresponding to the proportional factors $A_{ij}$, is/are employed to correct the measured values $D_i$.

6. The method according to claim 4, wherein when computing a respective correction factor $FK_i$ of the respective detector element, for several or all of the N light sources, the proportional factors $A_{ij}$ are multiplied with the light intensities MSj detected by the respective monitor elements at the time of the self-test.

7. The method according to claim 1, wherein to compute the respective correction factor $FK_i$, for several or all of the N light sources, the respective proportional factors $A_{ij}$ are multiplied with the respective light intensities $MS_j$ detected by the monitor elements at the time of the self-test and the results of these multiplications are summed up to compute the respective correction factor $FK_i$.

8. The method according to claim 7, wherein to correct the measured values $D_i$ of the value document, the respective measured value $D_i$ is multiplied with the correction factor $FK_i$, wherein the correction factors $FK_i$ are computed according to the following formula:

$$FK_i = \frac{\sum_{j=1}^{N} A_{ij} \cdot MA_j}{\sum_{j=1}^{N} A_{ij} \cdot MS_j}$$

wherein light intensities $MA_j$ are detected by the monitor elements at an earlier point in time.

9. The method according to claim 1, wherein to compute the respective correction factor $FK_i$ of the respective detector element, for several or all of the N light sources in each case the ratio is formed between the light intensity $MS_j$ detected by the monitor elements at the time of the self-test and light intensities $MA_j$ detected by the monitor elements at an earlier point in time, the respective ratio $MS_j/MA_j$ is multiplied with the respective proportional factor $A_{ij}$ and the results of these multiplications are summed up in order to compute the respective correction factor $FK_i$.

10. The method according to claim 9, wherein to correct the measured values $D_i$ of the value document, the respective measured value $D_i$
is multiplied with the respective correction factor $FK_i$, wherein the correction factors $FK_i$ are computed according to the following formula:

$$FK_i = \frac{\sum_{j=1}^{N} A_{ij}}{\sum_{j=1}^{N} A_{ij} \cdot \frac{MS_j}{MA_j}}$$

wherein light intensities $MA_j$ are detected by the monitor elements at an earlier point in time.

11. The method according to claim 1, wherein a calibration procedure is carried out before the self-test, in which a calibration medium is introduced into the capture range of the optical sensor and the N light sources are switched on in order to illuminate the calibration medium, wherein the monitor elements of the optical sensor each detect a light intensity $MA_j$, which corresponds to the light intensity emitted by the respective light source during the calibration procedure, wherein j=1 . . . N, and/or the detector elements of the optical sensor each detect a light intensity $DA_i$ emanating from the calibration medium, wherein i=1 . . . K.

12. The method according to claim 11, wherein to compute the respective correction factor $FK_i$ of the respective detector element also the light intensities $MA_j$ of the light sources are considered that the monitor elements have detected within the scope of the calibration procedure, wherein the respective light intensity $MA_j$ is put in each case in mutual relation with the light intensity $MS_j$ detected by the respective monitor element at the time of the self-test, wherein j=1 . . . N.

13. The method according to claim 11, wherein the light intensities $DA_i$ detected from the calibration medium by the detector elements within the scope of the calibration procedure are employed to correct the measured values $D_i$ detected from the value document, wherein the measured values $D_i$ of the respective detector element recorded from the value document are multiplied with a further correction factor $F_i$, which corresponds to the reciprocal of the light intensity $DA_i$ detected from the calibration medium by means of the respective detector element during the calibration procedure of the optical sensor.

14. The method according to claim 1, wherein temperature dependency of the monitor elements is also taken into account when correcting the measured values $D_i$, wherein, in particular with the aid of a temperature sensor installed in the optical sensor, a temperature of the monitor elements is measured at the time of the self-test and a temperature-dependent factor is determined based on the temperature measured in each case, with which the light intensities $MS_j$ detected by the monitor elements at the time of the self-test are corrected.

15. An optical sensor for checking a value document, which is introduced into a capture range of the optical sensor for its checking, wherein the optical sensor has:

a photodetector line, which has a number K of several detector elements arranged next to one another, which are configured to detect in each case an intensity of light emanating from a detection region of the value document, a line of light sources, which has a number N of several light sources arranged next to one another, which are configured to illuminate the value document, a monitor detector line, which has several photosensitive monitor elements arranged next to one another, wherein each monitor element is assigned to one of the light sources and is configured to detect an intensity $MS_j$ of light emitted by this light source and impinging on the respective monitor element, a control device which is adapted to switch on the N light sources simultaneously for the check of the value document in order to illuminate the value document with the light from the light sources, and to control the detector elements of the photodetector line in such a manner that these detector elements record measured values of the value document that correspond to light intensity emanating from the value document as a result of the illumination, wherein the K detector elements each record a measured value $D_i$ of the value document, wherein i=1 ... K, and carry out a self-test of the optical sensor, in which the N light sources are switched on and, with the aid of the monitor elements, the respective light intensity $MS_j$ of the light source assigned to the respective monitor element is detected, which impinges on the respective monitor element at a time of the self-test, in order to verify the light intensities $MS_j$ detected by the monitor elements at the time of the self-test, wherein j=1 ... N, an evaluation device which is adapted to correct the measured values $D_i$ of the value document based on the light intensities $MS_j$ detected by the monitor elements at the time of the self-test, wherein, when correcting, the measured value $D_i$ of the respective detector element is corrected in each case with a correction factor $FK_i$, which is computed individually for the respective detector element based on the light intensities $MS_j$ detected by several of the monitor elements at the time of the self-test, and check the value document based on the measured values corrected with the aid of the respective correction factor $FK_i$.

16. The method according to claim 1, wherein the monitor elements comprise photodetectors.

17. The optical sensor according to claim 15, wherein the monitor elements comprise photodetectors.

* * * * *